G. CASSADY.
NUT LOCK.
APPLICATION FILED JAN. 26, 1910.
990,106. Patented Apr. 18, 1911.
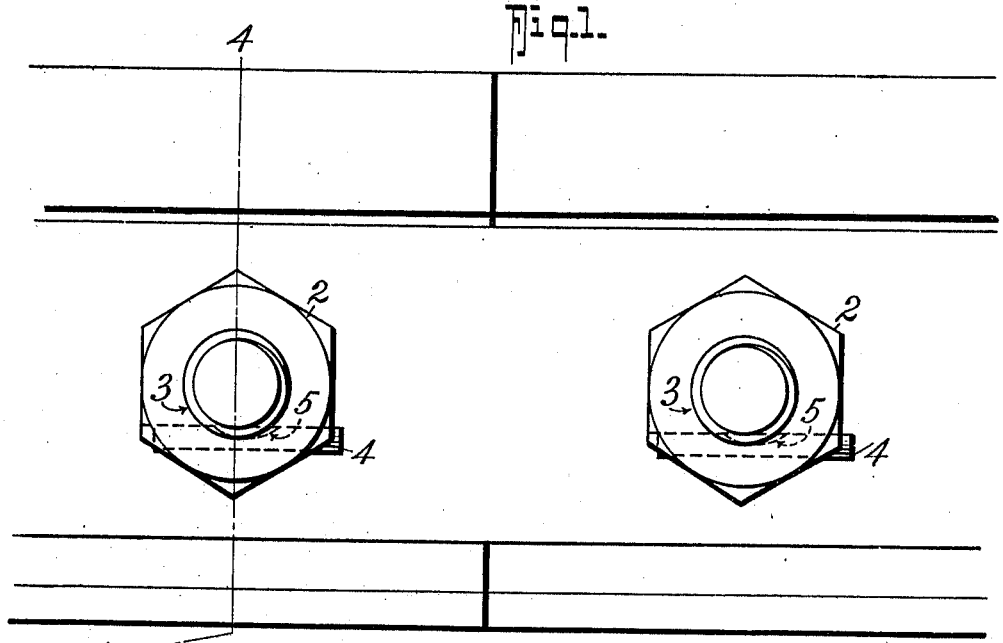
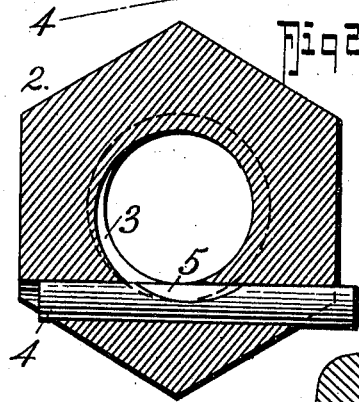
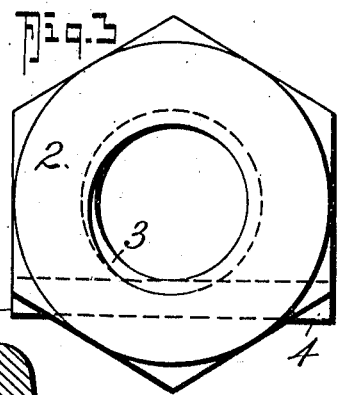
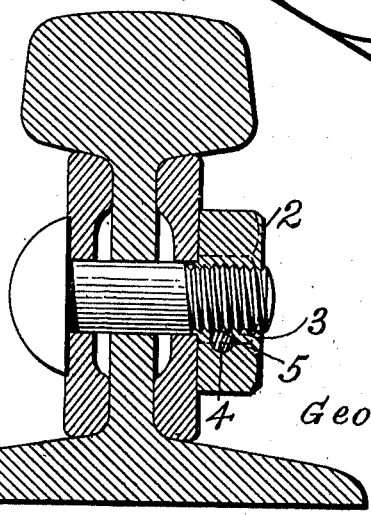
WITNESSES:
Charles H. Wagner
John T. Schroll
INVENTOR
George Cassady.
BY
Fred J. Dieterich
ATTORNEY.

UNITED STATES PATENT OFFICE.

GEORGE CASSADY, OF VANCOUVER, BRITISH COLUMBIA, CANADA.

NUT-LOCK.

990,106.     Specification of Letters Patent.     Patented Apr. 18, 1911.

Application filed January 26, 1910. Serial No. 540,144.

*To all whom it may concern:*

Be it known that I, GEORGE CASSADY, a citizen of the Dominion of Canada, residing at Vancouver, in the Province of British Columbia, Canada, have invented a new and useful Nut-Lock, of which the following is a specification.

This invention relates to a nut locking device designed to be contained within the body of the nut of which it practically forms a part, and that is withal cheap to manufacture and simple to apply to the nut and to lock and release it on its bolt.

The invention is particularly described in the following specification, reference being made to the drawings by which it is accompanied, in which:

Figure 1, is a side elevation of a rail joint showing the application of my invention. Fig. 2, is a section of a nut, the locking pin being partly driven in. Fig. 3, is an elevation of a nut showing the pin in its unlocking position. Fig. 4, is a cross section of the rail on the line 4—4 of Fig. 1.

In these drawings 2 represents the body of the nut, 3 being the thread. Through this nut before the thread is tapped in it a hole is drilled in a plane approximately parallel to the face of the nut and tangential to the thread, and a pin 4 tightly fitted in it; so that when the nut is tapped a portion of the thread is cut, as shown in Figs. 2 and 3, in the side of the pin 4 as well as in the nut. On entering the nut on the bolt the ends of the pin 4, as shown in Fig. 1, should be flush with the flats or side faces of the nut and when the nut has been screwed up to its desired place on the bolt the pin 4 is driven from one end so as to tighten, as shown in Fig. 2, the wedge-like portion 5 of the thread that is cut in the pin 4 on the thread of the bolt. The pin may be driven from either side but will preferably be driven from that side so that a slackening effort on the nut will tend rather to draw the pin further into engagement than to move it back, thus with a right hand thread the pin will be driven from left to right. An effective hold is thus secured by the nut on the thread of the bolt, and that, in a manner, that does not injure the thread of the bolt, as the portion of the thread of the pin that tightens the nut on the thread of the bolt corresponds to that thread. The means may also be readily released by driving the pin back to its unlocking position (Fig. 3) and be reapplied when required as the repeated use of it does not deteriorate its effectiveness. If for any reason greater security is called for a second lock pin may be furnished in the same nut.

The device is equally applicable to square or hexagon nuts either black forged or finished.

Having now particularly described my invention and the manner of its use, I hereby declare that what I claim as new and desire to be protected in by Letters Patent, is:

In combination with a nut having diametrically opposite flats or side faces, said nut having a bolt hole and a pin receiving hole disposed tangentially to, and partly intersecting said bolt hole and extending from one side face to the opposite side face and in a direction normal to said side faces, of a pin held in said pin hole and of a length equal to the length of said pin hole, said pin being threaded midway its ends to correspond to the threads of the bolt hole, said pin adapted to be forced longitudinally in said pin hole to project partly beyond one or the other of said side faces when in its locking position and being further adapted to lie wholly within said pin hole when in its unlocking position, substantially as shown and described.

In testimony whereof I have signed my name to this specification in the presence of two subscribing witnesses.

GEORGE CASSADY.

Witnesses:
    ROWLAND BRITTAIN,
    ALEXANDER SMITH.

---

Copies of this patent may be obtained for five cents each, by addressing the " Commissioner of Patents, Washington, D. C."